US006405329B1

(12) United States Patent
Colligan et al.

(10) Patent No.: US 6,405,329 B1
(45) Date of Patent: Jun. 11, 2002

(54) METHOD AND APPARATUS FOR HDD TIME STAMP BENCHMARK AND INSTALLATION IDENTIFICATION

(75) Inventors: Thomas R. Colligan, Austin; Craig Brandt, Round Rock, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/361,810

(22) Filed: Jul. 27, 1999

(51) Int. Cl.[7] ................................................ H02H 3/05
(52) U.S. Cl. ......................................... 714/57; 714/36
(58) Field of Search ............................. 714/57, 5, 6, 7, 714/20, 29, 36, 42, 54, 55, 718, 769, 770; 711/167, 100

(56) References Cited

U.S. PATENT DOCUMENTS 4,811,278 A * 3/1989 Bean et al. .................. 711/111
5,613,082 A * 3/1997 Brewer et al. ................ 711/4

OTHER PUBLICATIONS

"Technical Committee T13 AT Attachment", Updated Jul. 9, 1999, pp. 1–13.
Pete McLean, "SMART Device Error Log Reporting", Oct. 15, 1998, pp. 1–10.
Mark Evans, "Proposal For Extensions To The SMART Protocol", Dec. 11, 1998, pp. 1–8.
Thomas R. Colligan, "SMART Device Error/Activity Log Reporting", Oct. 23, 1998, pp. 1–15.
Thomas R. Colligan, "Proposal For Extensions To The D98135RO", Oct. 23, 1998, pp. 1–10.
"File Support For SMART Read/Write Logging And SMART Attributes And Thresholds", Apr. 27, 1999, pp. 1–4.
Western Digital, "Proposed Modification To Self–Test Log Descriptors", Feb. 11, 1999, p. 1.
Mark Evans, "Proposal For Modification To The SMART Self–Test Log Structure", Feb. 23, 1999, p. 1.
Peter T. McLean, "Information Technology—AT Attachment With Packet Interface—5 (ATA/ATAPI–5)", Mar. 5, 1999, p. 1–348.

* cited by examiner

*Primary Examiner*—Dieu-Minh Le
(74) *Attorney, Agent, or Firm*—Haynes and Boone, LLP

(57) ABSTRACT

A storage device includes at least one computer readable medium and an interface for use in coupling the storage device to a host. The interface is further for routing information to and from the at least one computer readable medium. At least one buffer is located in a reserved area of the at least one computer readable medium. Lastly, a controller is provided for logging characteristic operational information of the storage device in the at least one buffer upon an occurrence of an event initiated by the host. The characteristic operational information includes at least a power on hours (POHs) and a corresponding time stamp benchmark information.

45 Claims, 3 Drawing Sheets

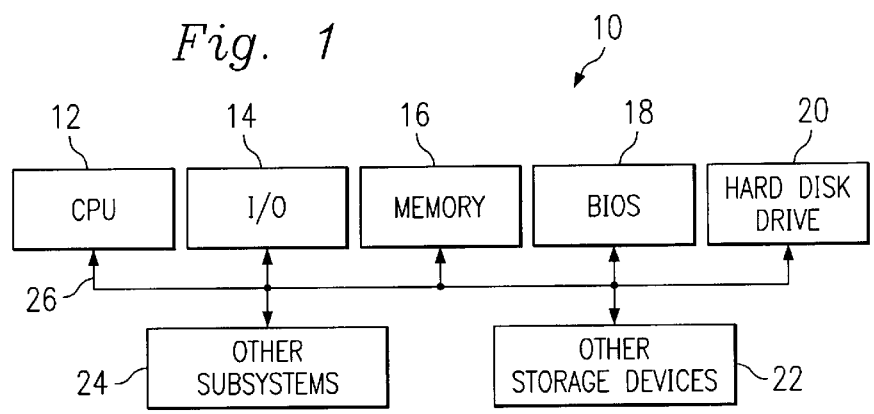
Fig. 1
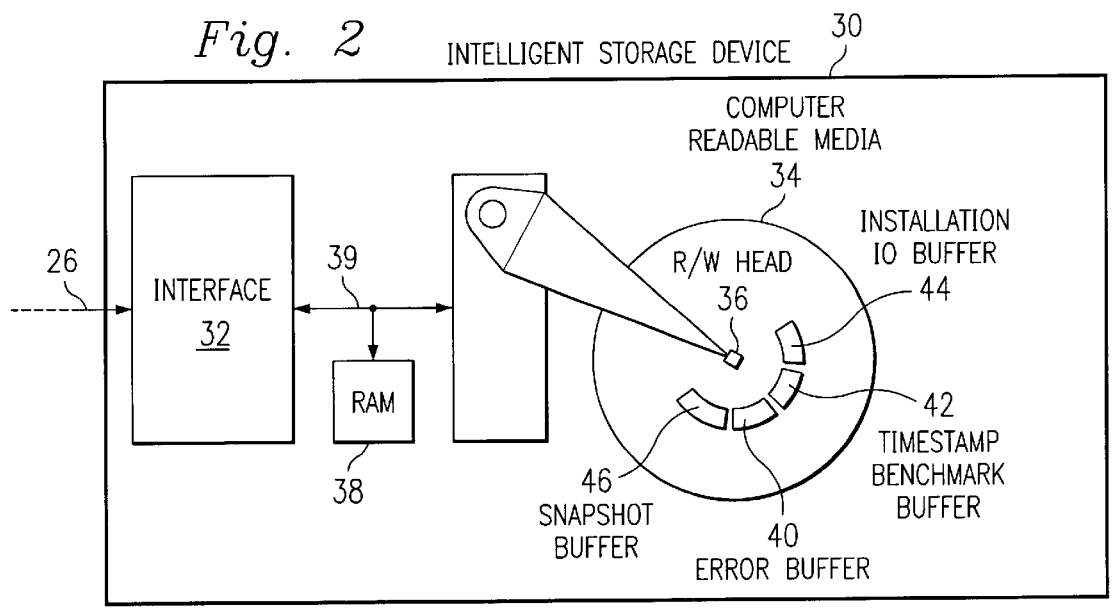
Fig. 2
Fig. 3
Fig. 4

Fig. 5 WRITE TIME STAMP BENCHMARK COMMAND

COMMAND:

| REGISTER | 7 | 6 | 5 | 4 | 3 | 2 | 1 | 0 |
|---|---|---|---|---|---|---|---|---|
| FEATURES | D6h | | | | | | | |
| SECTOR COUNT | 01h | | | | | | | |
| SECTOR NUMBER | 03h | | | | | | | |
| CYLINDER LOW | 4Fh | | | | | | | |
| CYLINDER HIGH | C2h | | | | | | | |
| DEVICE/HEAD | 1 | | 1 | D | | | | |
| COMMAND | B0h | | | | | | | |

Fig. 6

EXAMPLE: FEBRUARY 3, 1999 AT 2:47 PM

| BYTE | HEX | DEFINITION |
|---|---|---|
| 00 | 07 | FIRST HALF OF YEAR (1999) |
| 01 | CF | SECOND HALF OF YEAR |
| 02 | 02 | MONTH (2) |
| 03 | 03 | DAY (3) |
| 04 | 0E | 14:47 (2:47 PM) GETS TRUNCATED TO 14. |
| 05 | xx | |
| 06 | xx | |
| 7 | xx | |
| 8 | | ETC... |

Fig. 7

TIMESTAMP BUFFER FORMAT

| BYTE | DESCRIPTION |
|---|---|
| 00h | INDEX POINTER TO MOST RECENT TS |
| 01h-08h | 1st TIME STAMP DATA STRUCTURE |
| 09h-10h | 2nd TIME STAMP DATA STRUCTURE |
| 11h-18h | 3rd TIME STAMP DATA STRUCTURE |
| 19h-20h | 4th TIME STAMP DATA STRUCTURE |
| 21h-28h | 5th TIME STAMP DATA STRUCTURE |
| 29h-30h | 6th TIME STAMP DATA STRUCTURE |
| 31h-1B8h | 7th - 55th TIME STAMP STRUCTURE |
| 1B9h-1FEh | VENDOR SPECIFIC |
| 1FFh | CHECKSUM |

Fig. 8  READ TIME STAMP BENCHMARK COMMAND
COMMAND:

| REGISTER | 7 | 6 | 5 | 4 | 3 | 2 | 1 | 0 |
|---|---|---|---|---|---|---|---|---|
| FEATURES | D5h ||||||||
| SECTOR COUNT | 02h, 03h ||||||||
| SECTOR NUMBER | 02h ||||||||
| CYLINDER LOW | 4Fh ||||||||
| CYLINDER HIGH | C2h ||||||||
| DEVICE/HEAD | 1 | | 1 | D | | | | |
| COMMAND | B0h ||||||||

Fig. 9

EXAMPLE: FEBRUARY 3, 1999 AT 2:47 PM AND THE
DRIVE HAS 75 HOURS ON THE POH METER

| BYTE | HEX | DEFINITION |
|---|---|---|
| 00 | 07 | FIRST HALF OF YEAR (1999) |
| 01 | CF | SECOND HALF OF YEAR |
| 02 | 02 | MONTH (2) |
| 03 | 03 | DAY (3) |
| 04 | 0E | 14:47 (2:47 PM) GETS TRUNCATED TO 14. |
| 05 | 00 | POH MSB |
| 06 | 00 | |
| 07 | 4B | POH LSB (75 HOURS) |

Fig. 10

| REGISTER | 7 | 6 | 5 | 4 | 3 | 2 | 1 | 0 |
|---|---|---|---|---|---|---|---|---|
| ERROR | N/A | N/A | N/A | N/A | N/A | ABRT | N/A | N/A |
| SECTOR COUNT | N/A ||||||||
| SECTOR NUMBER | N/A ||||||||
| CYLINDER LOW | N/A ||||||||
| CYLINDER HIGH | N/A ||||||||
| DEVICE/HEAD | obs | N/A | obs | DEV | N/A ||||
| STATUS | BSY | DRDY | DF | N/A | DRQ | N/A | N/A | ERR |

METHOD AND APPARATUS FOR HDD TIME STAMP BENCHMARK AND INSTALLATION IDENTIFICATION

BACKGROUND

The disclosures herein relate generally to interfacing between a host computer system and a storage device, and more particularly, to a method and apparatus for hard disk drive time stamp benchmark and installation identification of the hard disk drive in a computer system.

The hard disk drive (HDD) industry is besieged with returned disk drives where the personnel receiving the reportedly failed HDD could not duplicate (CND) the reported failure. A new industry wide self-monitoring, analysis, and reporting technology (SMART) initiative is seeking to provide tools that can be incorporated within a hard disk drive to assist in failure analysis, prior to sending the disk drive back to the manufacturer. HDD's have a very impressive set of recovery mechanisms. The frequency of these events can indicate the pending failure of the device, but in many cases, the drive can successfully avert data loss and in-fact repair the drive without operator intervention or even knowledge that there was a potential problem with the device. One tool involves saving the error conditions, in some cases, with power on hours (POH's) of when an error occurred, in a reserved area of the hard disk drive. The saving of the POH's is only a partial solution, since POH's only increment when there is power applied to the hard disk drive.

In the past, a computer manufacturer has had to accept alleged defective hard disk drive devices back, with little troubleshooting in the field, since failure analysis in the field is generally difficult and time consuming. When there is any question about the health of the hard disk drive, the hard disk drive is generally sent back to the computer manufacturer, frequently CND. The return of hard disk drives that are CND negatively affects the reputation of the computer manufacturer and increases the computer manufacturer's initial failure incident rate (IFIR) on HDD's, one of the most expensive IFIR hits. IFIR is a metric used to measure failure of a product, i.e., a computer system, within a first thirty (30) day period of use in the field by a customer.

In addition to the above, while the return rate for HDDs may have gone down in recent history, the ever-increasing number of computer systems being shipped has resulted in an increase in the number of HDDs being returned. Tracking the hard disk drive through the return system at the factory and correlating the returned equipment activity logs from multiple databases has become very difficult. There are too many places in the returned equipment system at the factory where the hard disk drive device can be separated from the data stream, the data stream being one that permits meaningful information required for failure and trend analysis. While virtually all return activity of computer systems has been tracked in the past using a computer system service tag, a method is needed to semi-permanently mark a particular HDD as being a component of a particular computer system.

The prior methods for solving the above-mentioned problem relied on all repair personnel maintaining logs, tying the alleged defective component to the service tag of a given computer system. Paper logs were physically taped to the various device carriers used for transporting the defective devices, wherein the paper log method relied on HDDs always being returned to the appropriate carrier. In general, the previous system was not very-successful in accurately keeping track of a given HDD. With direct return, control of the tracking method needed to associate a given HDD device to the given HDD's prior computer system was lost.

An improved method and apparatus for tracking a given alleged failed HDD upon return to the factory for repair and error analysis is thus desired. In addition, a storage device having improved failure diagnostic capability is desired.

SUMMARY

According to one embodiment, the above problem is solved by the correlation of the POH's with a real date and time. A storage device includes at least one computer readable medium and an interface for use in coupling the storage device to a host. The interface is further for routing information to and from the at least one computer readable medium. At least one non-volatile buffer is located in a reserved area of the at least one computer readable medium. Lastly, an embedded controller with firmware is provided for logging characteristic operational information of the storage device in the at least one buffer upon an occurrence of an event initiated by the host. In addition to the characteristic operational information, at least a power on hours (POHs) and a corresponding time stamp information are provided.

The embodiments of the present disclosure advantageously provide an improved method of correlating the storage device to a computer system and correlating recent operating characteristics with the time and date of the behavior. In addition, the present embodiments provide an improved method and apparatus for tracking a given alleged failed HDD upon return to the factory for repair and error analysis.

BRIEF DESCRIPTION OF THE DRAWING FIGURES

The foregoing and other teachings and advantages of the present invention will become more apparent upon a detailed description of the best mode for carrying out the invention as rendered below. In the description to follow, reference will be made to the accompanying drawings, in which:

FIG. 1 is a block diagram view of a computer system for implementing an embodiment of the present disclosure;

FIG. 2 is a diagrammatic view illustrating a storage device according to an embodiment of the present disclosure;

FIG. 3 is a diagrammatic view illustrating a buffer containing POHs and time stamp information according to an embodiment of the present disclosure;

FIG. 4 is a diagrammatic view illustrating a buffer containing error types and POHs according to the present disclosure;

FIG. 5 is a table view of the WRITE TIMESTAMP benchmark command according to one embodiment;

FIG. 6 is an illustrative view of an exemplary time stamp for use in conjunction with the WRITE TIMESTAMP benchmark command;

FIG. 7 is an illustrative table view of a time stamp buffer format;

FIG. 8 is a table view of the READ TIMESTAMP benchmark command according to one embodiment;

FIG. 9 is an illustrative view of an exemplary time stamp as read via the READ TIMESTAMP benchmark command; and FIG. 10 is an illustrative table view of various registers, including an error register in association with an error output.

DETAILED DESCRIPTION

Referring now to FIG. 1, a system block diagram of a computer system 10 is shown having features thereof configured in accordance a customer configured computer system order as discussed herein. The computer system 10 includes a central processing unit (CPU) 12, input/output (I/O) devices, such as a display, a keyboard, a mouse, and associated controllers, collectively designated by a reference numeral 14, memory, such as a random access memory (RAM), designated by a reference numeral 16, BIOS (basic input output system) as stored on a read only memory (ROM), designated by a reference numeral 18, hard disk drive 20, and other storage devices, such as a may include a floppy disk drive, CD-rom drive, and the like, collectively designated by a reference numeral 22, and various other subsystems, such as a network interface card (or NIC), collectively designated by a reference numeral 24, all interconnected via one or more buses, shown collectively in FIG. 1 as a bus 26.

Turning now to FIG. 2, an intelligent storage device 30 is shown according to an embodiment of the present disclosure. Storage device 30 includes an interface 32, at least one computer readable medium 34, read/write head 36, an optional random access memory (RAM) device 38. A bus 39 interconnects interface 32, read/write head 36, and RAM 38. Interface 32 is for use in coupling the storage device 30 to a host, such as, computer system 10 of FIG. 1. Interface 32 routes information to and from the at least one computer readable medium 34. Still further, interface 32 can include an embedded controller with suitable firmware for logging characteristic operational information, as discussed herein. At least one non-volatile buffer is located in a reserved area of the at least one computer readable medium 34. For example, the at least one buffer may include an error buffer 40, a timestamp benchmark buffer 42, an installation ID buffer 44, and a snapshot buffer 46. The reserved area of the computer readable media of the disk drive is not a standard or normal user data area of the disk drive.

In FIG. 3, an exemplary timestamp benchmark buffer 42 is illustrated. The buffer 42 includes POH information 50 and corresponding time stamp information 52. POH is a cumulative measure of time that the disk drive or storage device has received power from the host system. When used for the very first time, the POH for the new disk drive is initially zero (00). The time stamp benchmark information 52 provides a real time 52a and date 52b for each POH entry in the timestamp benchmark buffer 42. In FIG. 3, a POH of sixteen (16) hours occurred at 7:00 a.m. on Jan. 3, 1999, as indicated by reference numeral 54. A POH of twenty-four (24) hours occurred at 7:00 a.m. on Jan. 4, 1999. In a preferred embodiment, the host system writes the real time and date onto the disk drive. More particularly, a routine stored in the BIOS of the host system implements the time stamp benchmark. Upon the occurrence of a prescribed event, such as a system boot, a BIOS routine may query the disk drive. During the query of the disk drive, the BIOS routine writes the POH and time stamp information to a designated location in the reserve area of the at least one computer readable medium of the disk drive. In an alternate embodiment, a disk operating system (DOS) or other operating system utility can be used by the host system processor for writing time stamp benchmark information onto the disk drive.

Referring now to FIG. 4, an exemplary error buffer 40 is illustrated. The buffer 40 includes error type information entries 60 and corresponding POH entries 62. Error buffer 40 is updated upon an occurrence of prescribed errors or corrective action events implemented by the disk drive. As illustrated in FIG. 4, a first read error (RE) occurred at a POH of twenty-two (22) hours, as indicated by reference numeral 64. A second read error occurred at a POH of twenty-six (26) hours.

The present embodiments provide a method of benchmarking the real world date and time of power on hours (POHs). Benchmarking the time stamp during a computer system boot, the storage device will contain prescribed information useful for calculating the date and time of when a disk drive error or corrective action event occurred. Being able to correlate error conditions to real time, a telephone computer service technician is permitted to communicate positively about the condition of the disk drive to a customer. The service technician can thus quickly determine if the disk drive is the cause of the current customer issue. With the present embodiments, if the disk drive is determined to be functional, the service technician knows to look elsewhere for a problem.

The present embodiments further provide a method of writing a System ID and Service Tag into an installation ID buffer 44 on a reserved area of computer readable medium 34 of the disk drive 30. The System ID identifies the platform type of the computer system that the HDD is installed in. The Service Tag identifies the specific computer system into which the HDD was installed, for example, the Service Tag may include a serial number or other suitable identification of the specific computer system. Writing the System ID and Service Tag onto the reserve area of the HDD permits the drive to be identified at any time. In one embodiment, the System ID and Service Tag may be incorporated into a system descriptor record (SDR). The SDR may also include a computer readable file which is descriptive of the hardware and software components to be included in the target computer system. Thus, the need to rely on taped-on labels, and the diligence of the service technicians handling a particular HDD, with respect to tracking of a returned disk drive at the factory, is significantly reduced, if not eliminated.

The HDD/System correlation is established by executing a prescribed command to the HDD, followed by data that represents the System ID and Service Tag provided by the computer system. It is intended that this command be executed only once in the factory at the time of initial HDD installation. In one embodiment, the System ID and Service Tag information is static data stored on computer readable media of the disk drive in an area normally reserved for logging of disk level error conditions.

A further correlation is established by executing a write command to the HDD followed by data that represents the date and time provided by the computer system. The date and time data is stored with a then current POH reading, thereby establishing a link between real time and the disk drive's POH reading. The date and time data is static data also stored on computer readable media of the disk drive in an area reserved for logging disk level conditions.

According to the present embodiments, incorporating a necessary level of detail in a storage device includes the generation of two new commands, WRITE TIMESTAMP and READ TIMESTAMP.

The Write Timestamp

The WRITE TIMESTAMP benchmark command includes the use of a number of eight bit registers. The registers include, for example, a features, sector count, sector number, cylinder low, cylinder high, device/head, and command registers. Exemplary codes for the registers may include the code D6h for the features register, the sector count 01h, the sector number 03h, the cylinder low 4Fh, the cylinder high C2h, and the command B0h. Lastly, the device/head register may be characterized as follows: bit-7 1, bit-5 1, bit-4 D, and the remaining bits don't care. See FIG. 5.

The time stamp data structure can be as follows. Out of 512 bytes, bytes 00–01 may include the year, byte 02 the month, byte 03 the day, byte 04 the hour (0–24 hours), and bytes 05–511 don't cares, as illustrated in the following table.

Time Stamp Data Structure

| Bytes | Description |
| --- | --- |
| 00–01 | Year (Y) |
| 02 | Month (M) |
| 03 | Day (D) |
| 04 | Hour (H, 0–24 hours) |
| 05–511 | Don't Cares |

The data is a straight HEX (un-encoded) representation of the respective parameters. Upon receipt of a WRITE TIMESTAMP command, the disk drive will append 3 bytes of POH to the first 5 bytes of the command data and store the resulting data in the Time Stamp Buffer. An exemplary time stamp of Feb. 3, 1999 at 2:47 PM is shown in FIG. 6.

According to one embodiment, the data (i.e., time stamp) is stored in a 55 segment, rotating buffer with the first location dedicated to contain the pointer of the most recent time stamp (i.e., segment). Byte 00h is assigned the index pointer to a most recent time stamp (TS). Bytes 01h–08h are assigned the $1^{st}$ time stamp data structure. Bytes 09h–10h are assigned the $2^{nd}$ time stamp data structure. Bytes 11h–18h are assigned the $3^{rd}$ time stamp data structure. Bytes 19h–20h are assigned the $4^{th}$ time stamp data structure. Bytes 21h–28h are assigned the $5^{th}$ time stamp data structure. Bytes 29h–30h are assigned the $6^{th}$ time stamp data structure. Bytes 31h–1B8h are assigned the $7^{th}$ through $55^{th}$ time stamp data structures, accordingly. Bytes 1B9h–1FEh are vendor specific bytes. Lastly, byte 1FFh is a checksum. In addition, the buffer is a circular buffer and the $56^{th}$ time stamp will overwrite the $1^{st}$ time stamp, the $57^{th}$ time stamp overwrites the $2^{nd}$ segment, etc. See FIG. 7.

At the time of manufacture of the disk drive, the complete time stamp buffer will be set to zero for indicating that a time stamp has not occurred.

The Read Timestamp

The READ TIMESTAMP benchmark command includes the use of a number of eight bit registers. The registers include a features, sector count, sector number, cylinder low, cylinder high, device/head, and command registers. Exemplary codes for the features register may include the code D5h, the sector count 02h or 03h, the sector number 02h, the cylinder low 4Fh, the cylinder high C2h, and the command B0h. Lastly, the device/head register can be characterized by the following: bit-7 1, bit-5 1, bit-4 D, and the remaining bits don't care. See FIG. 8.

The read timestamp command instructs the hard disk drive to provide the sector of timestamp data. The first byte is the number (1–55) of the most recent timestamp. See the timestamp buffer for the layout of the timestamps within the buffer.

The data structure for the timestamps can be as follows. Out of eight (8) bytes, bytes 00–01 may include the year (Y), byte 02 the month (M), byte 03 the day (D), byte 04 the hour (H, 0–24 hours), and bytes 05–07 the Power on Hours (POHs).

Read Time Stamp Data Structure

| Bytes | Description |
| --- | --- |
| 00–01 | Year (Y) |
| 02 | Month (M) |
| 03 | Day (D) |
| 04 | Hour (H) |
| 05–07 | Power On Hours (POH) |

The data is a straight HEX (un-encoded) representation of the respective parameters. FIG. 9 illustrates an exemplary time stamp of Feb. 3, 1999 at 2:47 PM and where the hard disk drive has 75 hours on the POH meter.

Error Outputs

If the hard disk device does not support the READ TIMESTAMP command, if SMART is disabled, or if the values in the Features, Cylinder Low, or Cylinder High registers are invalid, then the hard disk drive device shall return command aborted. See FIG. 10.

With respect to the Error register, abort (ABRT) shall be set to one if the READ TIMESTAMP command is not supported, if SMART is disabled, or if the input register values are invalid. In addition, ABRT may be set to one if the hard disk drive device is not able to complete the action requested by the command. With respect to the Device/Head register, DEV shall indicate the selected device. With respect to the Status register, busy (BSY) shall be cleared to zero indicating command completion; device ready (DRDY) shall be set to one; device fault (DF) shall be set to one if a device fault has occurred; device request (DRQ) shall be cleared to zero; and error (ERR) shall be set to one if an Error register bit is set to one.

According to the embodiments of the present disclosure, an intelligent storage device includes at least one computer readable medium, and an interface for use in coupling the storage device to a host, the interface further for routing information to and from the at least one computer readable medium. The intelligent storage device further includes at least one buffer located in a reserved area of the at least one computer readable medium and a means for logging characteristic operational information of the storage device in the at least one buffer. Characteristic operational information is logged upon an occurrence of or in response to an event initiated by the host. The characteristic operational information includes at least a power on hours (POHs) and a corresponding time stamp information.

The at least one buffer includes a first buffer and a second buffer, the first buffer for storing POHs and time stamp information upon an occurrence of a first prescribed event, the second buffer for storing POHs and error type information upon an occurrence of a second prescribed event in the performance of a storage device operation. The first prescribed event includes at least one of the following of a power ON event, a power OFF event, or other similar type event. The second prescribed event includes at least one of the following of a sector reallocation, position error, seek, reformat, or other similar type event.

The at least one buffer further includes a snapshot buffer. The snapshot buffer is provided for capturing prescribed storage device operational characteristics in response to a snapshot command. The storage device operational characteristics are those characteristics suitable for use in performing a diagnostic analysis of an operability of the storage device. In one embodiment, the host issues a snapshot command. In another embodiment, the storage device interface includes a control means which issues the snapshot command. The control means is also responsive to at least one command from the host for performing a storage device operation between the interface and the computer readable medium of the storage device. Lastly, the buffers include circular buffers.

The storage device still further includes a system descriptor record (SDR) stored in a reserved area of the computer readable medium, the SDR providing an identification of the host. The intelligent storage device may include a hard disk drive, a recordable CD-ROM drive, or other similar drive. The storage device further includes at least one non-volatile memory, such as RAM 38. The control means is further for temporarily storing the characteristic operational information of the storage device in the non-volatile memory of the storage device prior to logging the characteristic operational information in the at least one buffer.

The present embodiments provide a capability for more easily determining an operability condition of the particular HDD at some prior time. In one embodiment, when a flaw or disk drive failure event occurs, the event is given a code and then time stamped. A record of the failure events, as per their respective codes and time stamps, are kept in a log, the log including a circular buffer. The data stored in the log may be retrieved and analyzed to determine what has been happening with the HDD.

In the past, there existed no way of looking at what happened with the disk drive, after the fact. For example, disk drives have some intelligence built-in in that if the disk drive cannot read data on a first try, then the disk drive attempts to read the data on a second try. This type of activity goes on in the background operation of the disk drive.

With the present embodiments, a service tag is put onto the HDD, the service tag including information about the host system, for example, the processor type. Sometimes, problems with certain types of disk drive are encountered with particular types of processors more than others. Being able to analyze any possible trends between disk drives and processors, or other host system component, can be helpful information to have for a computer manufacturer if a large number of disk drive returns all used a similar processor or other host system component. The service tag information is placed on the HDD in a protected area, either the same or similar protected area as the error event and time stamp information. As a result, when an alleged defective HDD reaches the vendor, the particulars of the system that the HDD was used in can be readily determined.

The installation ID provides a tracking mechanism for being able to determine precisely where the disk drive came from, i.e., what host computer system the disk drive was installed in. The present embodiments further provide a tracking mechanism for providing an improved correlation between a particular disk drive and a customer's perceived problem. Repair data collected on the disk drive may be investigated, including a history of the repair ability of the disk drive where the disk drive repaired itself. As a disk drive repairs itself more and more, the disk drive tends to slow down in its speed of operation. With the error events log and corresponding time stamps, it can be more easily determined what is really wrong with a particular disk drive.

The information critical to determining any trends or defects in the disk drives and/or system combinations with the disk drive is advantageously stored on the drive itself via the error log, time stamps, and system installation ID information. A service technician can more readily make an assessment of the operability of the disk drive in the field.

With respect to the time stamp benchmark, at host system power up, through a BIOS routine or other operating system function, the real time date and time are written to the disk drive time stamp log, including POH. A starting point is thus provided, such that, on a given date, say at 3:00 p.m., the host system powered up and at 4:00 p.m., numerous disk drive errors occurred. The question then becomes, what happened between 3:00 p.m. and 4:00 p.m.? The customer or host system user can be queried to determine if the fault stems from a customer initiated action or if the disk drive itself is defective.

Every time the host system is powered ON, the disk drive starts incrementing the POH counter. The POH counter accumulates the power on hours of the disk drive. If the host system is turned ON in the morning and turned OFF at night, the POH counter starts accumulating at power ON and stops accumulating at power OFF. The next time the host system is powered ON, the POH counter again starts accumulating hours. Previously, POH alone could not be used to determine actually when an error occurred on the host system because of a lack of correlation to real time. The present embodiments provide that upon an occurrence of an event, the event is stored with POH, and POH is correlated with a time stamp. The interval for logging errors or other events in the error logs may be established as per the disk drive supplier in accordance with buffer size. Upon the occurrence of a threshold number of errors, the disk drive may be flagged or internally labeled as "don't use this drive anymore," or similar message.

The present embodiments provide an error history to enable a service technician to more easily determine what may have happened with a given disk drive. A SMART bit may be set or an error flag issued, thus indicating an occurrence of an excessive or abnormal number of soft errors or other prescribed errors. The present embodiments enable the service technician to determine when given errors began to occur. For instance, in reviewing an error log, the service technician can determine that the drive worked okay up to a particular point (e.g., 20 days), then encountered soft errors, etc. Position errors can be a strong indication that the disk drive may have encountered a physical hit, having been dropped or handled improperly. Using information obtained via the time stamp benchmark, a time and date of the occurrence of an event can be determined. For example, an executive may have been traveling with his notebook computer and while traveling, the notebook computer was accidently dropped and the disk drive damaged. Subsequent to being dropped, the disk drive encounters numerous errors. The date and time provided by the time stamp benchmark are thus helpful for the service technician.

With respect to the buffers, the buffers include registers preferably implemented by the disk drive manufacturer. Each disk drive is manufactured to a particular standard, for example, ATA, SCSI or other standard. Each disk drive has functionality built-in. The interface provides a mechanism which enables the disk drive to communicate with a host system in a defined manner. The defined manner provides a depository for the time stamp and installation ID data.

The location of the time stamp and installation ID data may change as desired and/or required for a particular disk drive application. For instance, in one embodiment, data is stored in a buffer in a reserved area on the recordable media. In another embodiment, the data is stored in a buffer in non-volatile RAM of the disk drive. If necessary, data can first be stored in non-volatile RAM, and then in the reserved area on the recordable media. Logging of data initially in RAM can be accomplished faster than on the computer readable media. As the host system powers down, or at an appropriate time, data is transferred from RAM to the computer readable media. The later assists in providing an improved performance in the disk drive operation.

The present embodiments thus offer solutions to the problems relating to returned disk drives:

1) the time stamp is designed to correlate real time and date with the POH hours stored in the disk drive's error log, and
2) provide a system level ID (Service Tag) on the HDD that identifies it as coming from a very specific computer system.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims. For example, the present embodiments are applicable to other types of recordable media disk drives, such as, recordable CD-ROM drives.

What is claimed is:

1. A storage device comprising:
   at least one computer readable medium;
   an interface for use in coupling said storage device to a host, said interface further for routing information to and from said at least one computer readable medium;
   at least one buffer located in a reserved area of said at least one computer readable medium; and
   control means for logging characteristic operational information of said storage device in said at least one buffer upon an occurrence of an event initiated by the host, the characteristic operational information including at least a power on hours (POHs) and a corresponding time stamp information.

2. The storage device of claim 1, wherein said at least one buffer includes a first buffer and a second buffer, the first buffer for storing POHs and time stamp information upon an occurrence of a first prescribed event, the second buffer for storing POHs and error type information upon an occurrence of a second prescribed event in the performance of a storage device operation.

3. The storage device of claim 2, wherein the first prescribed event includes at least one of the following selected from the group consisting of a power ON event and a power OFF event.

4. The storage device of claim 2, wherein the second prescribed event includes at least one of the following selected from the group consisting of a sector reallocation, position error, seek, and reformat.

5. The storage device of claim 1, further comprising a system descriptor record (SDR) stored in a reserved area of said at least one computer readable medium, the SDR providing an identification of the host.

6. The storage device of claim 1, wherein said storage device includes a hard disk drive.

7. The storage device of claim 1, wherein said storage device includes a recordable CD-ROM drive.

8. The storage device of claim 1, wherein said at least one buffer includes a snapshot buffer, the snapshot buffer for capturing prescribed storage device operational characteristics in response to a snapshot command, the storage device operational characteristics suitable for use in performing a diagnostic analysis of an operability of said storage device.

9. The storage device of claim 8, wherein the host issues the snapshot command.

10. The storage device of claim 8, wherein said control means issues the snapshot command.

11. The storage device of claim 1, further wherein said control means is responsive to at least one command from the host for performing a storage device operation between said interface and said at least one computer readable medium.

12. The storage device of claim 1, wherein the POHs represents a cumulative quantity of power on hours during the lifetime of said storage device.

13. The storage device of claim 1, wherein the time stamp includes a date and time data structure presented in response to a time stamp command issued by the host.

14. The storage device of claim 1, wherein said at least one buffer includes a circular buffer.

15. The storage device of claim 1, further comprising:
   at least one non-volatile memory, wherein said control means is further for temporarily storing the characteristic operational information of said storage device in said at least one non-volatile memory prior to logging the characteristic operational information in said at least one buffer.

16. A computer system comprising:
   at least one processor;
   at least one memory coupled to said at least one processor to facilitate execution of computer readable instructions of at least one computer program by said at least one processor; and
   at least one storage device for storing the at least one computer program, said at least one storage device including
   at least one computer readable medium,
   an interface for use in coupling said at least one storage device to said at least one processor, the interface further for routing information to and from the at least one computer readable medium,
   at least one buffer located in a reserved area of the at least one computer readable medium, and
   control means for logging characteristic operational information of said at least one storage device in the at least one buffer upon an occurrence of an event initiated by the at least one processor, the characteristic operational information including at least a power on hours (POHs) and a corresponding time stamp information.

17. The computer system of claim 16, wherein the at least one buffer includes a first buffer and a second buffer, the first buffer for storing POHs and time stamp information upon an occurrence of a first prescribed event, the second buffer for storing POHs and error type information upon an occurrence of a second prescribed event in the performance of a storage device operation.

18. The computer system of claim 17, wherein the first prescribed event includes at least one of the following selected from the group consisting of a power ON event and a power OFF event.

19. The computer system of claim 17, wherein the second prescribed event includes at least one of the following selected from the group consisting of a sector reallocation, position error, seek, and reformat.

20. The computer system of claim 16, further comprising a system descriptor record (SDR) stored in a reserved area of the at least one computer readable medium, the SDR providing an identification of said computer system.

21. The computer system of claim 16, wherein said at least one storage device includes a hard disk drive.

22. The computer system of claim 16, wherein said at least one storage device includes a recordable CD-ROM drive.

23. The computer system of claim 16, wherein the at least one buffer includes a snapshot buffer, the snapshot buffer for capturing prescribed storage device operational characteristics in response to a snapshot command, the storage device operational characteristics suitable for use in performing a diagnostic analysis of an operability of said at least one storage device.

24. The computer system of claim 23, wherein said at least one processor issues the snapshot command.

25. The computer system of claim 23, wherein the control means issues the snapshot command.

26. The computer system of claim 16, further wherein the control means is responsive to at least one command from said at least one processor for performing a storage device operation between the interface and the at least one computer readable medium.

27. The computer system of claim 16, wherein the POHs represents a cumulative quantity of power on hours during the lifetime of said at least one storage device.

28. The computer system of claim 16, wherein the time stamp includes a date and time data structure presented in response to a time stamp command issued by said at least one processor.

29. The computer system of claim 16, wherein said at least one buffer includes a circular buffer.

30. The computer system of claim 16, wherein said at least one storage device further includes at least one non-volatile memory, wherein the control means is further for temporarily storing the characteristic operational information of said at least one storage device in the at least one non-volatile memory prior to logging the characteristic operational information in the at least one buffer.

31. A method of data storage in a host computer system comprising:

providing at least one computer readable medium;

providing an interface for use in coupling a storage device to the host, the interface further for routing information to and from the at least one computer readable medium;

providing at least one buffer located in a reserved area of the at least one computer readable medium; and providing a controller for logging characteristic operational information of the storage device in the at least one buffer upon an occurrence of an event initiated by the host, the characteristic operational information including at least a power on hours (POHs) and a corresponding time stamp information.

32. The method of claim 31, wherein
the at least one buffer includes a first buffer and a second buffer, the first buffer for storing POHs and time stamp information upon an occurrence of a first prescribed event, the second buffer for storing POHs and error type information upon an occurrence of a second prescribed event in the performance of a storage device operation.

33. The method of claim 32, wherein the first prescribed event includes at least one of the following selected from the group consisting of a power ON event and a power OFF event.

34. The method of claim 32, wherein the second prescribed event includes at least one of the following selected from the group consisting of a sector reallocation, position error, seek, and reformat.

35. The method of claim 31, further comprising:

storing a system descriptor record (SDR) in a reserved area of the at least one computer readable medium, the SDR providing an identification of the host.

36. The method of claim 31, wherein the storage device includes a hard disk drive.

37. The method of claim 31, wherein the storage device includes a recordable CD-ROM drive.

38. The method of claim 31, wherein the at least one buffer includes a snapshot buffer, the snapshot buffer for capturing prescribed storage device operational characteristics in response to a snapshot command, the storage device operational characteristics suitable for use in performing a diagnostic analysis of an operability of the storage device.

39. The method of claim 38, wherein the host issues the snapshot command.

40. The method of claim 38, wherein the controller issues the snapshot command.

41. The method of claim 31, further wherein the controller is responsive to at least one command from the host for performing a storage device operation between the interface and the at least one computer readable medium.

42. The method of claim 31, wherein the POHs represents a cumulative quantity of power on hours during the lifetime of the storage device.

43. The method of claim 31, wherein the time stamp includes a date and time data structure presented in response to a time stamp command issued by the host.

44. The method of claim 31, wherein the at least one buffer includes a circular buffer.

45. The method of claim 31, further comprising:

providing at least one non-volatile memory, wherein the controller is further for temporarily storing the characteristic operational information of the storage device in the at least one non-volatile memory prior to logging the characteristic operational information in the at least one buffer.

* * * * *